US006843059B2

United States Patent
Burrus et al.

(10) Patent No.: US 6,843,059 B2
(45) Date of Patent: Jan. 18, 2005

(54) COMBUSTOR INLET DIFFUSER WITH BOUNDARY LAYER BLOWING

(75) Inventors: David Louis Burrus, Cincinnati, OH (US); Jack Rogers Taylor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 10/299,230

(22) Filed: Nov. 19, 2002

(65) Prior Publication Data

US 2004/0093871 A1 May 20, 2004

(51) Int. Cl.[7] .............................. F02C 1/00; F02C 3/00; F02G 3/00
(52) U.S. Cl. ............................. 60/751; 60/782; 60/785; 415/207
(58) Field of Search ........................ 80/751, 782, 785; 415/207, 211.2, 224.5

(56) References Cited

U.S. PATENT DOCUMENTS

| | | | | |
|---|---|---|---|---|
| 2,556,161 A | * | 6/1951 | Bailey et al. ................. | 60/751 |
| 3,879,939 A | * | 4/1975 | Markowski ................... | 60/751 |
| 4,029,430 A | | 6/1977 | Fonda-Bonardi | |
| 4,098,073 A | * | 7/1978 | Adkins et al. ................ | 60/791 |
| 4,194,359 A | * | 3/1980 | Brookman et al. ........... | 60/804 |
| 4,279,569 A | * | 7/1981 | Harloff ....................... | 415/53.3 |
| 4,316,721 A | * | 2/1982 | Weiss et al. .................. | 440/47 |
| 4,320,304 A | * | 3/1982 | Karlsson et al. .............. | 290/55 |
| 4,482,290 A | * | 11/1984 | Foreman et al. ............. | 415/207 |
| 5,115,642 A | * | 5/1992 | Cvelbar et al. ............... | 60/751 |
| 5,316,437 A | | 5/1994 | Czachor | |
| 5,339,622 A | * | 8/1994 | Bardey et al. ........... | 60/39.092 |
| 5,592,821 A | * | 1/1997 | Alary et al. .................. | 60/751 |
| 6,360,763 B1 | | 3/2002 | Narayanan et al. | |
| 6,390,418 B1 | | 5/2002 | McCormick et al. | |

* cited by examiner

*Primary Examiner*—Justine R. Yu
*Assistant Examiner*—William H. Rodriguez
(74) *Attorney, Agent, or Firm*—William Scott Andes; Steven J. Rosen

(57) ABSTRACT

A gas turbine engine combustor inlet diffuser assembly has at least one diverging annular wall including a flowpath surface bounding a diffuser flowpath. An annular blowing slot is axially located along the annular wall and an annular blowing air flowpath leads to and is in fluid communication with the blowing slot. An annular array of scoops disposed in the diffuser flowpath downstream of the blowing slot have upstream facing openings and are in fluid communication with the blowing air flowpath. The annular scoops are supported on hollow struts. Each of the hollow struts has at least one radially extending flow passage for directing blowing air from the scoop to the blowing air flowpath. The blowing slot opens in a downstream direction with respect to the diffuser flowpath. A row of blowing air compressor blades disposed across the blowing air flowpath may be used to pump up the pressure of the blowing air.

21 Claims, 7 Drawing Sheets

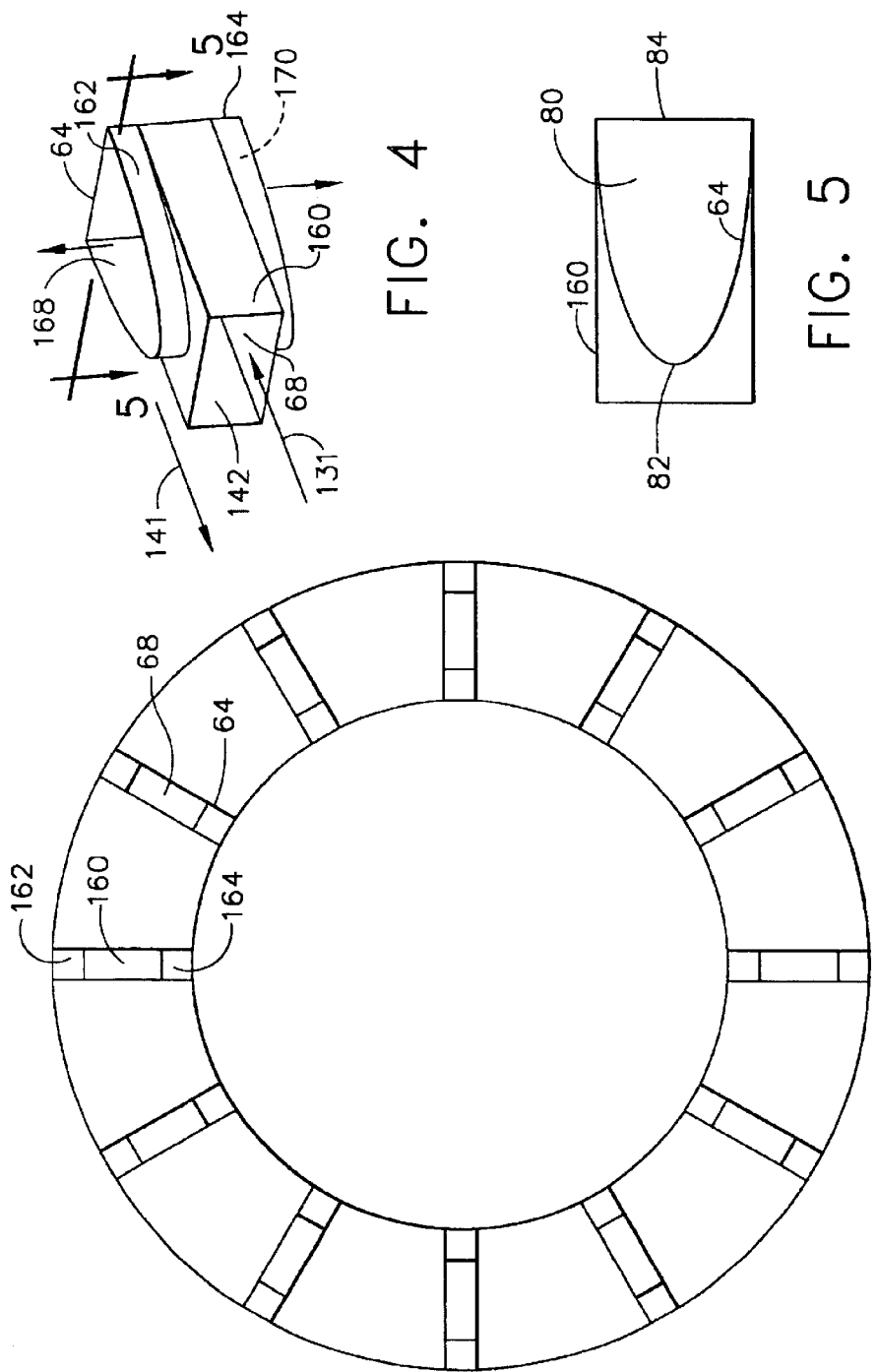

COMBUSTOR INLET DIFFUSER WITH BOUNDARY LAYER BLOWING

BACKGROUND OF THE INVENTION

1. Field of the Invention

The present invention relates generally to gas turbine engine combustor inlet diffusers and, more specifically, to blowing air into boundary layers of annular walls surrounding diffuser flowpath.

2. Background Art

A conventional gas turbine engine includes in serial flow communication, a compressor, a discharge flowpath having a stage of inlet compressor outlet guide vanes (OGVs), disposed between annular inner and outer walls, which in turn are mounted in an OGV support structure mechanically tied into an engine casing. Outlet guide vanes typically have airfoil like cross-sections that include a leading edge, a relatively thick middle section, and a thin trailing edge. Downstream of the OGVs is a combustor inlet diffuser, a combustor, a turbine nozzle, and a high pressure turbine. Typically, OGV inner and outer walls are supported by corresponding inner and outer annular diffuser inlet walls to form a relatively leak-free flowpath therebetween and support the OGVs and diffuser. The OGVs, inner and outer walls, and diffuser may be a single piece, integrally cast assembly or in some other constructions corresponding inner and outer OGV walls with the OGVs therebetween are welded to a diffuser casing.

During engine operation, the compressor compresses inlet airflow, which is therefore heated thereby. The discharged compressed and heated airflow is then channeled through the OGVs and the diffuser to the combustor wherein it is conventionally mixed with fuel and ignited to form combustion gases. The combustion gases are channeled through the turbine nozzle to the high pressure turbine which extracts energy therefrom for rotating and powering the compressor.

Typically, the high pressure air at the compressor exit is conditioned to have low swirl and low Mach number for use in the combustor and the outlet guide vanes and diffuser are employed to condition the compressor discharge air to be suitable for the combustor. Some engine configurations also require the OGVs to serve as a structural member which places additional constraints on the design. Conventionally, outlet guide vanes reside in a constant annulus height flowpath. The flowpath may help turn the flow radially outwardly to help align it with the downstream combustor. The OGVs are designed to remove tangential swirl from the compressor discharge air so that upon leaving the OGVs air flows nominally in the axial direction. In the process of deswirling, the flow's tangential momentum is converted to static pressure, reducing the flow's absolute Mach number. The diffuser defines a diffuser flowpath downstream of the OGV trailing edge, which further decreases the flow Mach number by one or by a plurality of diverging annular passages. These passages may also guide the flow radially outwardly, providing yet, more diffusion for a given annulus height. Adequate efficiency and stall margin are obtained by employing sufficient airfoil solidity, selecting proper airfoil incidence, optimizing the surface velocity distributions, and providing enough diffuser length/area ratio to avoid flow separation.

It is desirable to supply high pressure compressor exit air to the combustor as efficiently as possible with sufficient stall margin while minimizing engine length and hence weight and cost. Reduced length typically results in higher diffusion rates which makes the boundary layers more susceptible to separation which negatively impact performance and stall margin. Thus, reduced length and high diffusion rates tend to be conflicting requirements. It is desirable to reduce the axial length required to deliver this air and hence to reduce engine length, weight, and cost while maintaining performance and stall margin.

New gas turbine engine designs have been proposed employing advanced compressors that operate with very high compressor exit Mach numbers. At sea level take off conditions, the compressor exit Mach number may be as high as 0.45, with a dynamic velocity head of about 12.5 percent of the total pressure. Conventional combustor inlet diffusers, designed for these conditions, have high pressure losses, which would cause a considerable increase in engine specific fuel consumption. To minimize these losses, the diffuser must recover as much of this velocity head as possible. A very long conventional diffuser may recover as much as one-half of this velocity head, but the pressure losses would still be high and the engine would be considerably longer and heavier. Short length, low pressure loss diffuser designs are needed for these advanced engine applications.

One proposed approach to solve this problem is to use boundary layer bleed on the outer and inner walls of the diffuser to prevent flow separation in short length, high area ratio diffusers. However, bleed diffusers require the removal of 8 to 12 percent of the compressor exit flow for good diffuser performance. For good engine performance, this flow must be reintroduced into the engine with minimum pressure losses. Some of this flow could be used for turbine cooling, but at this point in the engine cycle, the pressure is considerably lower than the compressor exit pressure, which would result in sizable pressure losses for the bleed flow.

It is highly desirable in the gas turbine engine industry and, particularly, in the aircraft gas turbine engine industry to design and build short combustor inlet diffusers. In order to do this, it is desirable to build such diffusers with apparatus that prevents or delays separation of the boundary layer in an efficient manner.

SUMMARY OF THE INVENTION

A gas turbine engine combustor inlet diffuser assembly includes a diffuser having at least one diverging annular wall including a flowpath surface bounding a diffuser flowpath and an annular blowing slot axially located along the annular wall. One exemplary embodiment of the combustor inlet diffuser assembly further includes an annular blowing air flowpath leading to and in fluid communication with the blowing slot. An annular array of air scoops mounted on hollow struts are disposed in the diffuser flowpath downstream of the blowing slot.

Each of the air scoops has an upstream facing opening and is in fluid communication with the blowing air flowpath through one of the supporting hollow struts. Each hollow struts has at least one radially extending flow passage that extends radially from the scoop and connects to and is in fluid communication with the blowing air flowpath. Each hollow strut has an airfoil shaped cross-section, a strut leading edge, and a bluff body downstream end. The air scoops open in an upstream direction with respect to the diffuser flowpath.

A more particular embodiment of the diffuser assembly includes radially spaced apart diverging annular inner and outer walls and each of the inner and outer walls has a flowpath surface bounding a diffuser flowpath extending between the inner and outer walls. Radially inner and outer annular blowing slots are axially located along the inner and outer walls, respectively. Radially inner and outer annular blowing air flowpaths lead to and are in fluid communication with the radially inner and outer annular blowing slots, respectively. The scoops and the hollow struts which support the struts are disposed in the diffuser flowpath downstream of the blowing slots and the scoop has an upstream facing opening. The scoops are in fluid communication with the blowing air flowpaths. Radially inner and outer strut portions of the hollow strut extend radially inwardly and outwardly each of the annular scoop, respectively, and the radially inner and outer strut portions have radially inwardly and outwardly extending flow passages, respectively, between an interior of the scoop and the radially inner and outer annular blowing air flowpaths, respectively. The air scoops open in an upstream direction with respect to the diffuser flowpath.

Another exemplary embodiment of the diffuser assembly includes the radially spaced apart diverging annular inner and outer walls, each of which includes the flowpath surface bounding the diffuser flowpath. The radially inner and outer annular blowing slots are axially located along the inner and outer walls, respectively. The radially inner and outer annular blowing air flowpaths which lead to and are in fluid communication with the radially inner and outer annular blowing slots, respectively, are in fluid communication with the diffuser flowpath downstream of the slots. The radially inner and outer annular blowing air flowpaths are in fluid communication with the diffuser flowpath through apertures or bleed holes downstream of the slots.

Another exemplary embodiment includes at least one radially inner annular row and at least one radially outer annular row of blowing air compressor blades attached to the compressor of the engine and disposed radially across the radially inner and outer annular blowing air flowpaths, respectively, upstream of the radially inner and outer annular blowing slots.

The invention provides a gas turbine engine design that reduces the axial length of the diffuser. The invention reduces engine length, weight, and cost by preventing flow separation along the annular walls of the diffuser while maintaining acceptable levels of engine performance and stall margin.

BRIEF DESCRIPTION OF DRAWINGS

The novel features characteristic of the invention are set forth and differentiated in the claims. The invention, in accordance with preferred and exemplary embodiments, is more particularly described in the following detailed description taken in conjunction with the accompanying drawing in which:

FIG. 3 is a schematic view illustration of the air scoops taken through 3—3 in FIG. 1.

FIG. 4 is a perspective view illustration of one of the air scoops illustrated in FIG. 2 mounted on a hollow strut.

FIG. 5 is a cross-sectional view illustration of the strut and the air scoop taken through 5—5 in FIG. 4.

DETAILED DESCRIPTION OF THE INVENTION

Figure 1:
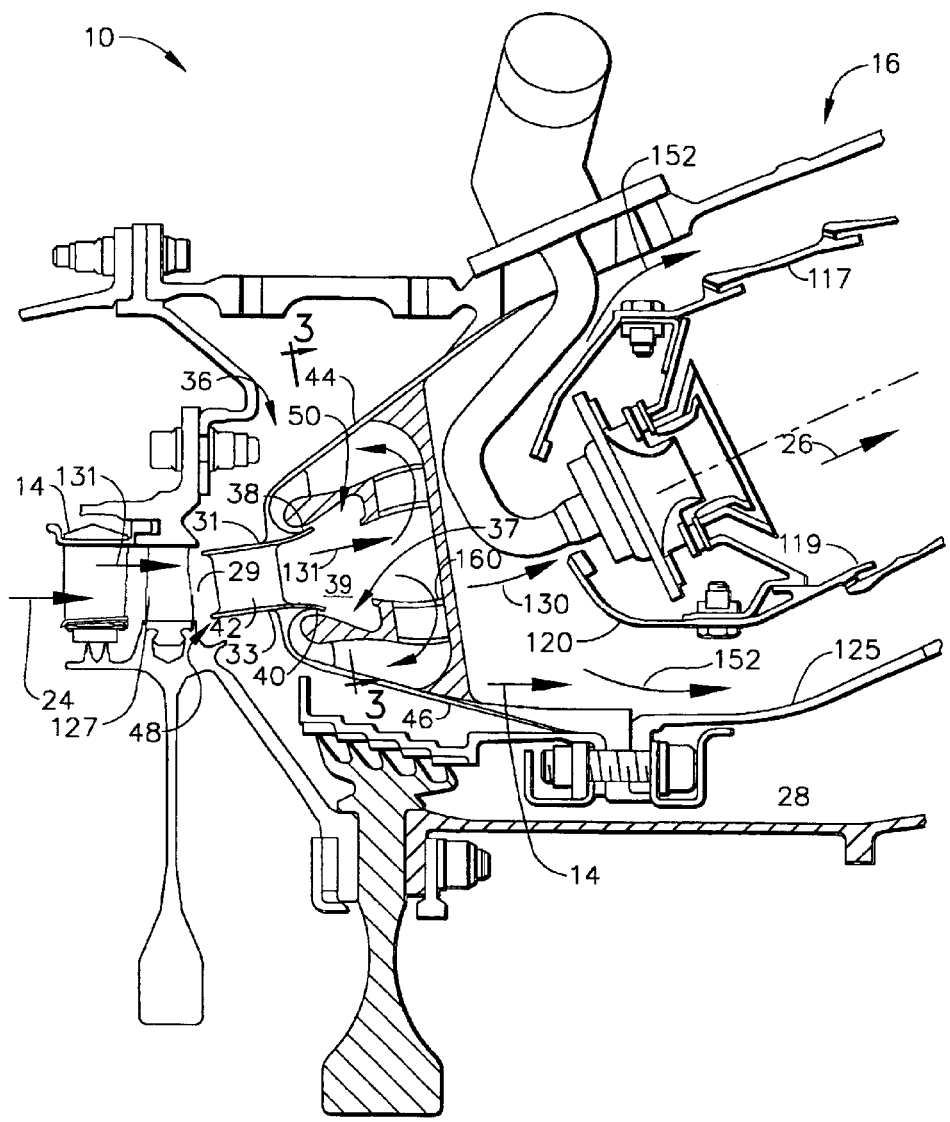
FIG. 1 is a cross-sectional view illustration of an axial gas turbine engine combustor and a compressor discharge section of the engine having an exemplary diffuser with blowing slots.

Illustrated in FIG. 1 is a portion of a gas turbine engine 10 including in serial flow communication about an axial centerline axis 12 conventional annular and axisymmetric structures including an axial flow compressor 14 and a combustor 16. The compressor 14 receives inlet airflow and compresses it into relatively hot compressed airflow 24 which is flowed through a gas turbine engine outlet guide vane and diffuser assembly 36 to the combustor 16 in which it is conventionally mixed with fuel and ignited for generating combustion gases 26. The gases 26 are flowed into a turbine (not shown) which extracts energy therefrom for rotating the turbine, which in turn, rotates and powers the compressor 14 through a shaft 28.

The outlet guide vane and diffuser assembly 36 has integral outlet guide vane section 48 and a combustor inlet diffuser 50. The outlet guide vane section is located forward or upstream of the diffuser 50. The outlet guide vane section 48 includes a plurality of circumferentially spaced radially extending outlet guide vanes (OGVs) 42 extending radially across a compressor flowpath 29 between annular outer and inner bands 31 and 33, respectively. The annular outer and inner bands 31 and 33 support the OGVs 42 and are disposed coaxially about the centerline axis 12. The outlet guide vanes 42 have airfoil cross-sections with leading edges 62 and trailing edges 66.

The diffuser 50 extends downstream from the OGVs 42. An outer diffuser support 44 extends axially aftwardly and radially outwardly from the annular outer wall 38 and is fixedly joined to a radially outer engine casing 34. An annular inner diffuser support 46 extends axially aftwardly and radially inwardly from the annular inner wall 40 to a radially inner combustor casing 125. The exemplary embodiment of the integral outlet guide vane 48 and diffusers 50 of the outlet guide vane and diffuser assembly 36 illustrated herein is an integral unit that may be fabricated by welding or other joining methods. In the exemplary embodiment of the present invention assembly, the outlet guide vane and diffuser assembly 36 is integrally formed such as by casting as a single piece. The diffuser 50 may also be a separate integral unit fabricated by welding or other joining methods such as being integrally formed by casting. The diffuser 50 is also referred to as a combustor diffuser.

Figure 2:
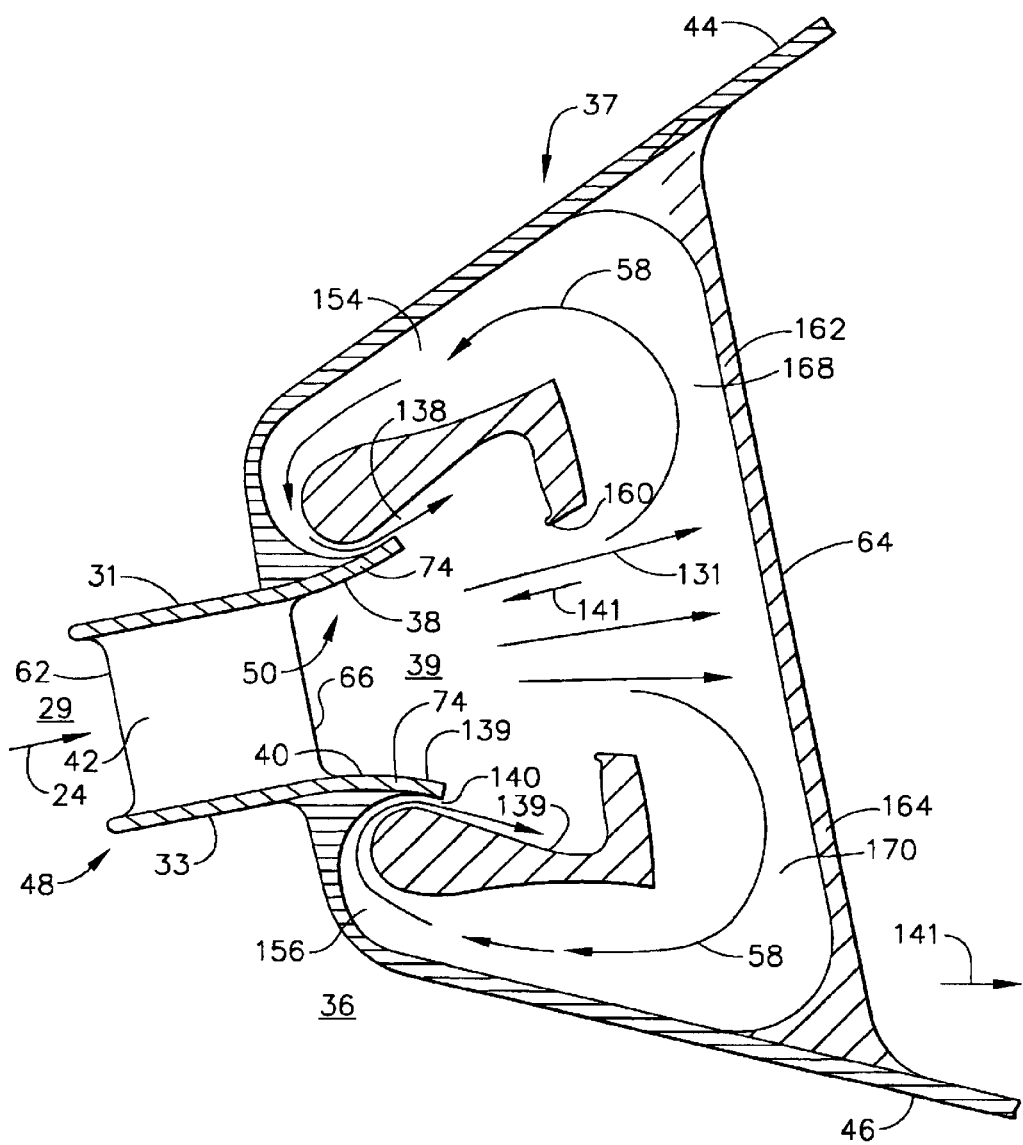
FIG. 2 is an enlarged cross-sectional view illustration of the compressor discharge section and diffuser assembly including an air scoop for supplying blowing air to the blowing slots illustrated in FIG. 1.
Figure 6:
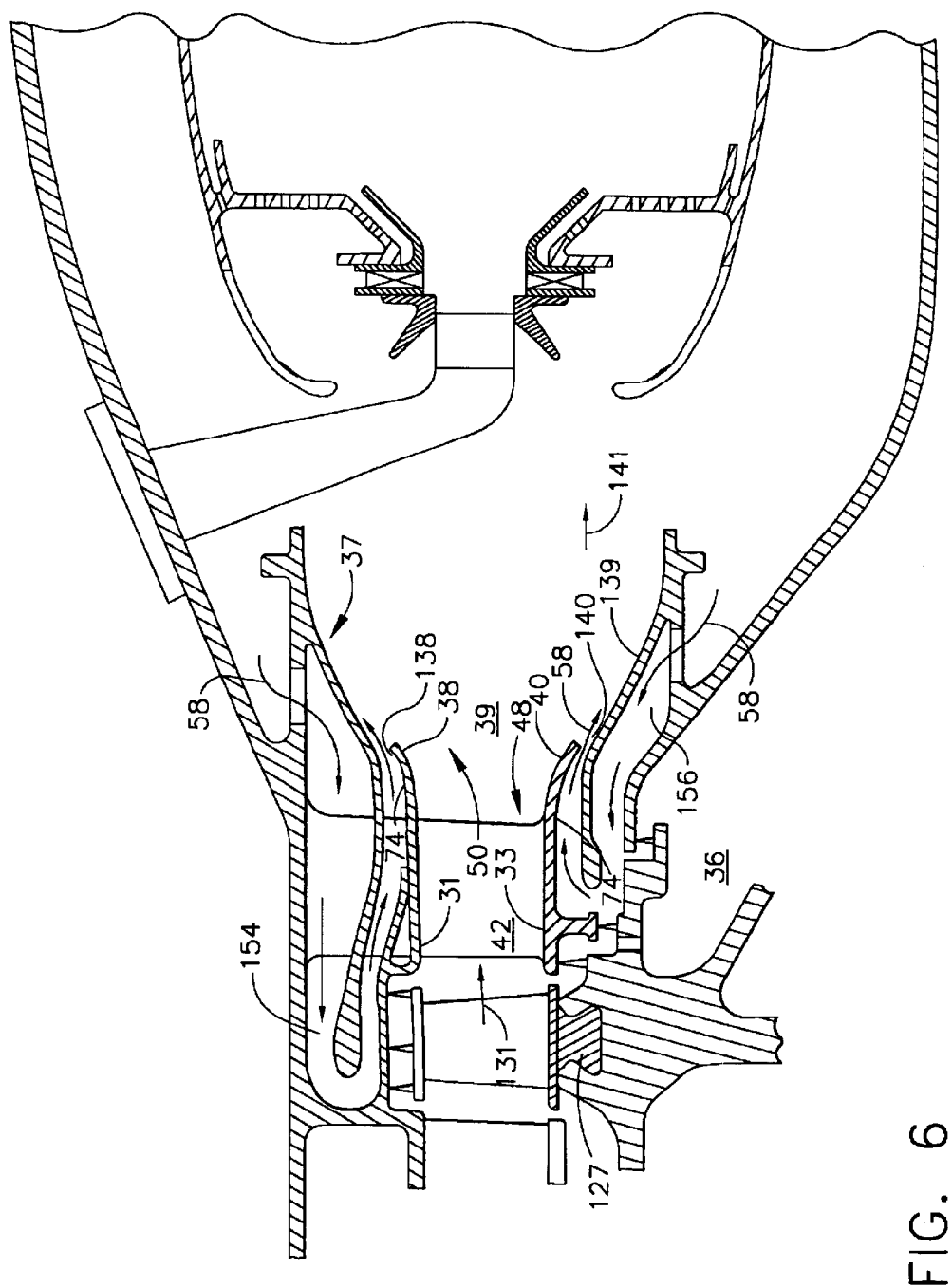
FIG. 6 is an illustration of a first alternative exemplary diffuser having a source of blowing air downstream of the diffuser assembly.

Illustrated in FIG. 2 is a first exemplary embodiment of a gas turbine engine combustor inlet diffuser assembly 37 which includes the diffuser 50. The diffuser assembly 37 includes the radially spaced apart diverging annular inner and outer walls 40 and 38 and each of the inner and outer walls has a flowpath surface 139 bounding a diffuser flowpath 39 extending between the inner and outer walls. The hot compressed airflow 24 produced by the compressor 14 flows through the diffuser flowpath 39. Radially annular inner and outer blowing slots 140 and 138 are axially located along the inner and outer walls 40 and 38, respectively, direct blowing air 58 along the flowpath surfaces 139 of the diverging annular inner and outer walls 40 and 38. The annular inner and outer blowing slots 140 and 138 are axially located near upstream ends 74 of the inner and outer walls 40 and 38 and are designed to blow the blowing air 58 into the boundary layers along the flowpath surfaces 139 of the outer walls 38 in order to prevent or delay separation of the boundary layer. Other types of apertures may be used in place of the blowing slots.

The blowing air 58 is ducted through radially annular inner and outer blowing air flowpaths 156 and 154 that lead to and are in fluid communication with the radially annular inner and outer blowing slots 140 and 138, respectively. The diffuser flowpath 39, containing compressor discharge pressure (CDP) air 131, serves as one source of the blowing air 58. The blowing air 58 may be extracted from the compressor discharge pressure air 131 from a location that captures the total head of the compressor discharge pressure air. The blowing air 58 may be extracted from locations in the gas turbine engine combustor inlet diffuser assembly 37 or other parts of the engine where the air has sufficiently high total pressure to be blown or injected into the boundary layers. It is beneficial to maintain low velocities in the blowing air flowpaths 156 and 154 for low pressure losses. The blowing air 58 is turned to the downstream direction and accelerated into the annular inner and outer blowing slots 140 and 138 to energize the diffuser wall boundary layers and prevent flow separation in the diffuser.

Blowing along flowpath surfaces 139 of the annular inner and outer walls 40 and 38 of the diffuser 50 allows the boundary layers to tolerate more diffusion before separation occurs. This increased extra diffusion may be used to reduce the diffuser length while increasing the area ratio of diffusers. This increased extra diffusion may also be used to reduce the diffuser length while achieving the same diffuser exit area and/or increase the diffuser exit area while maintaining the same diffuser length. A shorter diffuser with higher loading allows a shorter overall gas turbine engine configuration with reduced pressure losses.

One embodiment of the blowing source is an annular array of air scoops 160 mounted on and in fluid communication with hollow struts 64 and disposed in a middle area of the diffuser flowpath 39 downstream of the blowing slot 140 as illustrated in FIGS. 2, 3, 4, and 5. The air scoops 160 are disposed in an area of the diffuser flowpath 39 in which the total pressure is highest. Each of the air scoops 160 has an upstream facing opening 142 and is in fluid communication with the radially inner and outer annular blowing air flowpaths 156 and 154 through one of the supporting hollow struts 64. Radially inner and outer strut portions 164 and 162 of the hollow strut 64 extend radially inwardly and outwardly respectively from the annular scoop 160. The radially inner and outer strut portions 164 and 162 have radially inwardly and outwardly extending flow passages 170 and 168 that extend between an interior 68 of the scoop 160 and the radially inner and outer annular blowing air flowpaths 156 and 154, respectively. Each hollow strut 64 has an airfoil shaped cross-section 80, a strut leading edge 82, and a bluff body downstream end 84. The air scoops 160 open in an upstream direction 141 with respect to the diffuser flowpath 39.

Referring to FIG. 1, the combustor 16 is generally annular in form and centered about the centerline axis 12 and includes an outer combustor liner 117, an inner combustor liner 119, and a dome inlet module 120. The combustor 16 is radially outwardly bounded by the engine casing 34 and radially inwardly bounded by the inner combustor casing 125. The dome inlet module 120 is in direct flow communication with the diffuser assembly 37 positioned upstream thereof. The dome inlet module 120 is designed to receive combustor air flow 130 which is a substantial first portion of what is referred to as the compressor discharge pressure (CDP) air 131. CDP air 131 is conventionally defined as the compressed air flow at the exit of a last rotatable stage 127 of the high pressure compressor, typically denoted at compressor outlet guide vanes. A second portion 152 of the CDP air 131 (the compressed air flow produced by the compressor 14) is flowed around the dome inlet module 120 and the outer and inner combustor liners 117 and 119, respectively.

Figure 8:
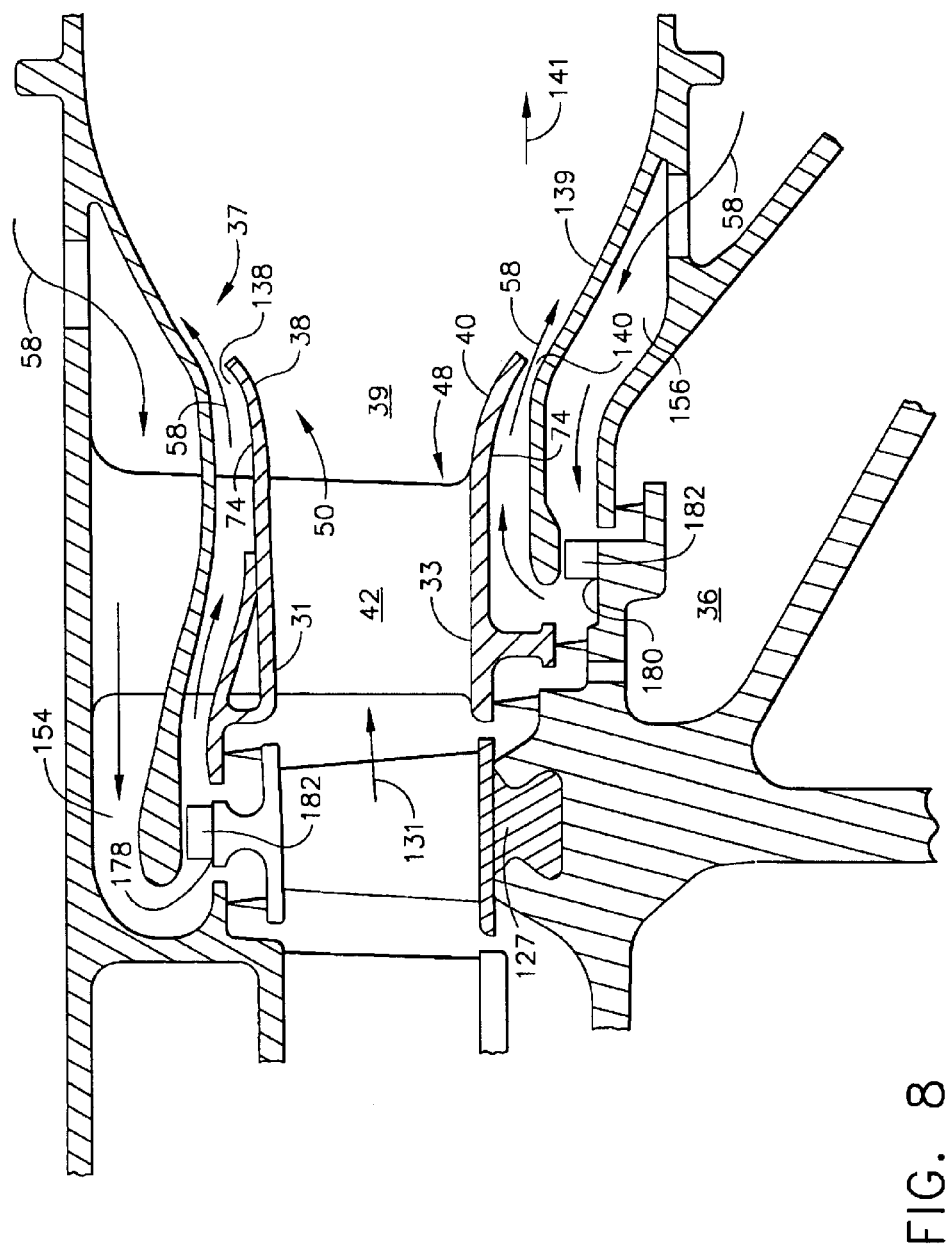
FIG. 8 is an illustration of a third alternative exemplary diffuser having the assembly illustrated in FIG. 6 and further including compressor driven booster stages of compressor blades disposed across radially inner and outer annular blowing air flowpaths connecting the source of blowing air to the slots.

If more pressure rise in the blowing air 58 is desired, at least one radially inner annular row 180 and at least one radially outer annular row 178 of blowing air compressor blades 182 may be disposed radially across the radially inner and outer annular blowing air flowpaths 156 and 154, respectively, upstream of the radially inner and outer annular blowing slots 140 and 138 as illustrated in FIG. 8. The radially inner and outer annular rows 180 and 178 of blowing air compressor blades 182 are fixedly attached to the last rotatable stage 127 of the compressor 14.

Figure 7:
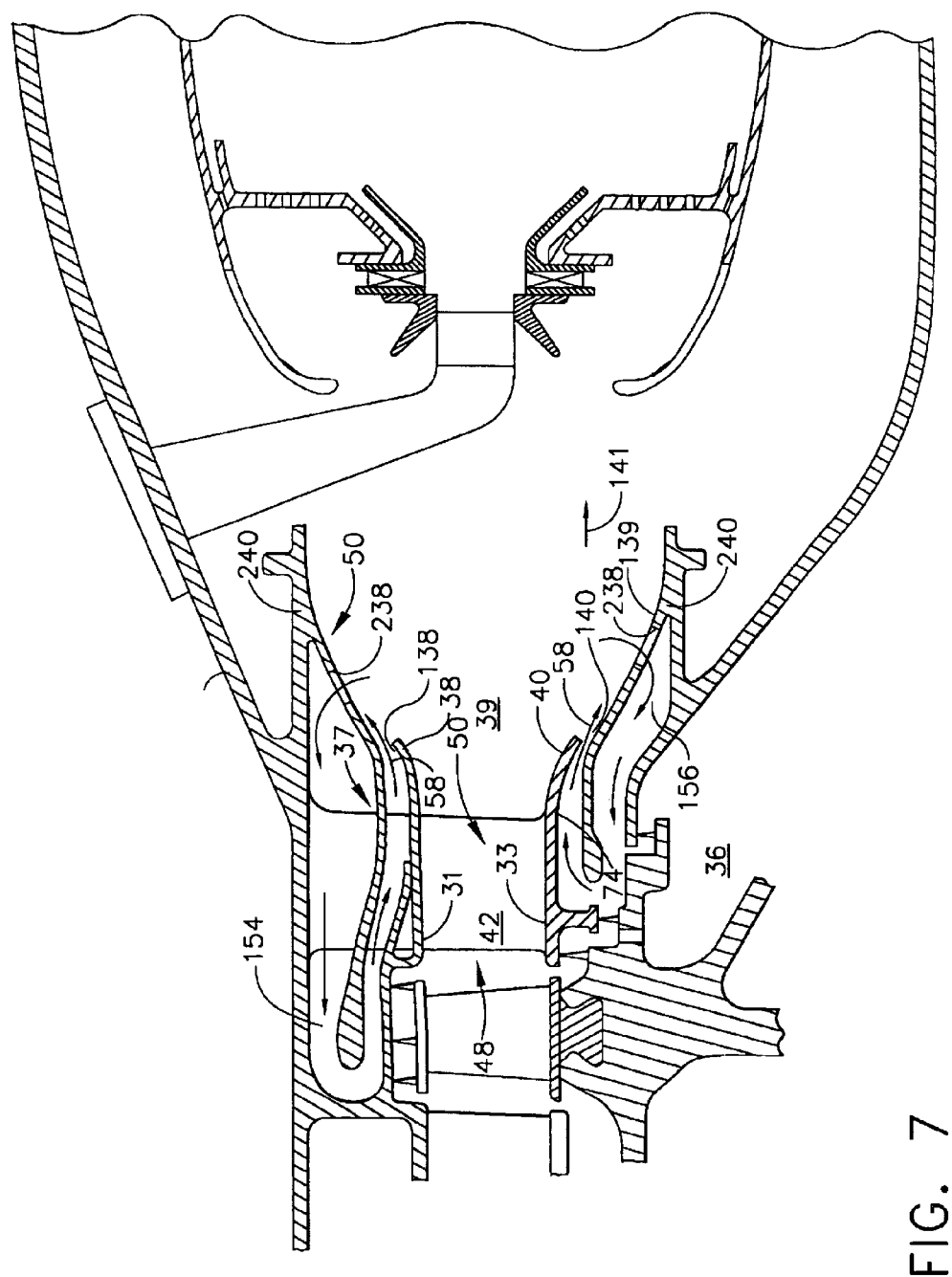
FIG. 7 is an illustration of a second alternative exemplary diffuser having a source of blowing air in the diffuser.
Figure 9:
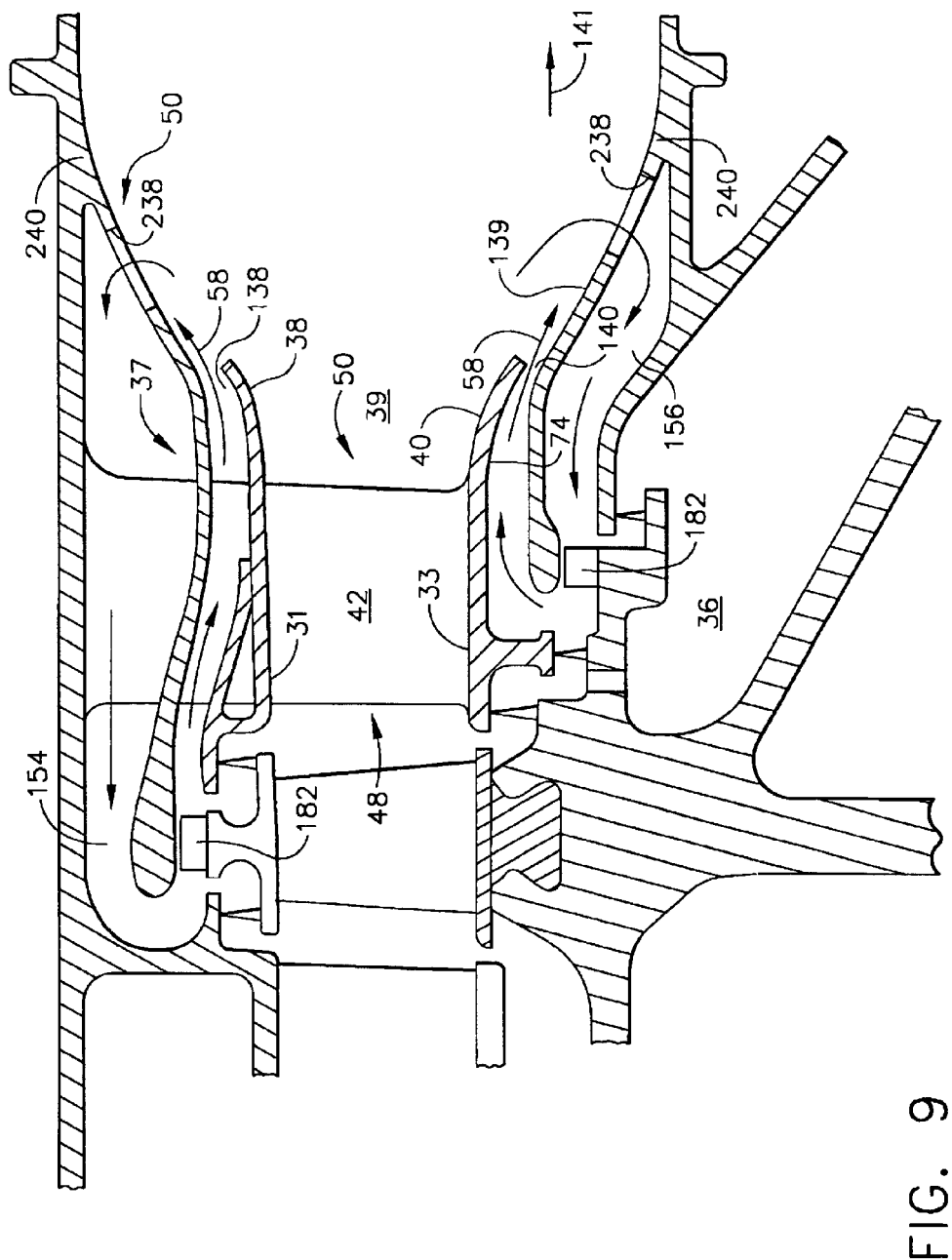
FIG. 9 is an illustration of a fourth alternative exemplary diffuser having the assembly illustrated in FIG. 7 and further including compressor driven booster stages of compressor blades disposed across radially inner and outer annular blowing air flowpaths connecting the source of blowing air to the slots.

Alternatively, as illustrated in FIG. 7, the source of the blowing source air 58 can be the diffuser flowpath 39. Bleed holes 238 in the inner and outer walls 40 and 38 and located at an aft end 240 of the diffuser assembly 37 or of the inner and outer walls 40 and 38 place the diffuser flowpath 39 in fluid communication with the inner and outer annular blowing air flowpaths 156 and 154. The bleed holes 238 can be located elsewhere along the walls so long as they are located sufficiently downstream of the blowing slots so that the diffuser flow at that location has sufficient static pressure to be bled from the diffuser flowpath through the radially inner and outer annular blowing air flowpaths 156 and 154. The bleed holes 238 serve as a source of the blowing air 58. This particular embodiment makes use of the blowing slots to energize the boundary layers and uses the bleed flow extracted through the bleed holes 238 to remove any remaining weak boundary layers. This combination will result in a relatively flat diffuser exit velocity profile and low diffuser pressure losses. Again, if more pressure rise in the blowing air 58 is desired, at least one radially inner annular row 180 and at least one radially outer annular row 178 of blowing air compressor blades 182 may be disposed radially across the radially inner and outer annular blowing air flowpaths 156 and 154, respectively, upstream of the radially inner and outer annular blowing slots 140 and 138 as illustrated in FIG. 9.

An aircraft gas turbine engine having the diffuser and blowing slots described above can be designed, built, and operated at sea level take off conditions including a compressor exit Mach number which may be in a range of about 0.40–0.60. The compressor exit Mach number and dynamic velocity head are conditions of compressor discharge pressure (CDP) air 131 at the exit of the last rotatable stage 127 of the high pressure compressor, typically denoted at the trailing edges of the compressor outlet guide vanes.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine combustor inlet diffuser assembly comprising:

a diffuser having at least one diverging annular wall, the annular wall having a flowpath surface bounding a diffuser flowpath, an annular blowing slot axially located along the annular wall, an annular blowing air flowpath leading to and in fluid communication with the blowing slot, an annular array of air scoops mounted on and in fluid communication with hollow struts disposed in the diffuser flowpath downstream, with respect to the diffuser flowpath, of the blowing slot, each of the scoops having an upstream facing opening, and the scoops being in fluid communication with the blowing air flowpath.

2. An assembly as claimed in claim 1 further comprising at least one radially extending flow passage in each of the hollow struts and that extends radially from the scoop and connects to and is in fluid communication with the blowing air flowpath.

3. An assembly as claimed in claim 1 wherein the blowing slot opens in a downstream direction with respect to the diffuser flowpath.

4. An assembly as claimed in claim 1 further comprising a source of blowing air located downstream, with respect to the diffuser flowpath, of the blowing slot and in fluid communication with the blowing air flowpath.

5. A gas turbine engine combustor inlet diffuser assembly comprising:

a diffuser having at least one diverging annular wall, the annular wall having a flowpath surface bounding a diffuser flowpath, an annular blowing slot axially located along the annular wall, an annular blowing air flowpath leading to and in fluid communication with the blowing slot, and at least one inner annular row of blowing air compressor blades disposed radially across the blowing air flowpath upstream of the blowing slot with respect to the blowing air flowpath.

6. A gas turbine engine combustor inlet diffuser assembly comprising:

a diffuser having at least one diverging annular wall, the annular wall having a flowpath surface bounding a diffuser flowpath, an annular blowing slot axially located along the annular wall, an annular blowing air flowpath leading to and in fluid communication with the blowing slot, and bleed holes in the annular wall, the bleed holes being located at an aft end of the annular wall in fluid communication with the annular blowing air flowpath.

7. An assembly as claimed in claim 6 further comprising at least one inner annular row of blowing air compressor blades disposed radially across the blowing air flowpath upstream of the blowing slot with respect to the blowing air flowpath.

8. A gas turbine engine combustor inlet diffuser assembly comprising:

a diffuser having at least one diverging annular wall, the annular wall having a flowpath surface bounding a diffuser flowpath.

an annular blowing slot axially located along the annular wall, an annular blowing air flowpath leading to and in fluid communication with the blowing slot, bleed holes in the annular wall, the bleed holes located downstream, with respect to the diffuser flowpath, of the blowing slot, and the bleed holes being in fluid communication with the blowing air flowpath.

9. An assembly as claimed in claim 8 further comprising at least one inner annular row of blowing air compressor blades disposed radially across the blowing air flowpath upstream, with respect to the blowing air flowpath, of the blowing slot.

10. A gas turbine engine combustor inlet diffuser assembly comprising:

a diffuser having at least one diverging annular wall, the annular wall having a flowpath surface bounding a diffuser flowpath, an annular blowing slot axially located along the annular wall, an annular blowing air flowpath leading to and in fluid communication with the blowing slot, a source of blowing air located downstream, with respect to the diffuser flowpath, of the blowing slot and in fluid communication with the blowing air flowpath, and at least one inner annular row of blowing air compressor blade disposed radially across the blowing air flowpath upstream, with respect to the blowing air flowpath, of the blowing slot.

11. A gas turbine engine combustor inlet diffuser assembly comprising:

a diffuser having radially spaced apart diverging annular inner and outer walls, each of the inner and outer walls having a flowpath surface bounding a diffuser flowpath extending between the inner and outer walls, and radially inner and outer annular blowing slots for directing blowing air into a boundary layer along the flowpath surface of each of the inner and outer walls to prevent or delay separation of the boundary layer, the blowing slots being axially located along the inner and outer walls, respectively.

12. An assembly as claimed in claim 11 further comprising radially inner and outer annular blowing air flowpaths leading to and in fluid communication with the radially inner and outer annular blowing slots, respectively.

13. A gas turbine engine combustor inlet diffuser assembly comprising:

a diffuser having radially spaced apart diverging annular inner and outer walls, each of the inner and outer walls having a flowpath surface bounding a diffuser flowpath extending between the inner and outer walls, radially inner and outer annular blowing slots axially located along the inner and outer walls, respectively, radially inner and outer annular blowing air flowpaths leading to and in fluid communication with the radially inner and outer annular blowing slots, respectively, an annular array of air scoops mounted on and in fluid communication with hollow struts disposed in the diffuser flowpath downstream of the blowing slot, each of the scoops having an upstream facing opening, and the scoops being in fluid communication with the blowing air flowpaths.

14. An assembly as claimed in claim 13 further comprising radially inwardly and outwardly extending flow passages in each of the hollow struts and that extend radially inwardly and outwardly from the scoop and connects to and are in fluid communication with the radially inner and outer annular blowing air flowpaths, respectively.

15. A gas turbine engine combustor inlet diffuser assembly comprising:

a diffuser having radially spaced apart diverging annular inner and outer walls, each of the inner and outer walls having a flowpath surface bounding a diffuser flowpath extending between the inner and outer walls, radially inner and outer annular flowing slots axially located along the inner and outer walls, respectively, radially inner and outer annular blowing air flowpaths leading to and in fluid communication with the radially inner and outer annular blowing slots, respectively, at least one radially inner annular row and at least one radially outer annular row of blowing air compressor blades disposed radially across the radially inner and outer annular blowing air flowpaths, respectively, and the inner and outer annular rows of blowing air compressor blades being located upstream of the radially inner and outer annular blowing slots, respectively.

16. A gas turbine engine combustor inlet diffuser assembly comprising:

a diffuser having radially spaced apart diverging annular inner and outer walls, each of the inner and outer walls having a flowpath surface bounding a diffuser flowpath extending between the inner and outer walls, radially inner and outer annular blowing slots axially located along the inner and outer walls, respectively, radially inner and outer annular blowing air flowpaths leading to and in fluid communication with the radially inner and outer annular blowing slots, respectively, bleed holes in the annular inner and outer walls, the bleed holes located at aft ends of the annular inner and outer walls, and the bleed holes in the annular inner and outer walls being in fluid communication with the radially inner and outer annular blowing air flowpaths, respectively.

17. An assembly as claimed in claim 16 further comprising: at least one radially inner annular row and at least one radially outer annular row of blowing air compressor blades disposed radially across the radially inner and outer annular blowing air flowpaths, respectively, and the inner an outer annular rows of blowing air compressor blades being located upstream of the radially inner and outer annular blowing slots, respectively.

18. A gas turbine engine combustor inlet diffuser assembly comprising:

a diffuser having radially spaced apart diverging annular inner and outer walls, each of the inner and outer walls having a flowpath surface bounding a diffuser flowpath extending between the inner and outer walls, radially inner and outer annular blowing slots axially located along the inner and outer walls, respectively, radially inner and outer annular blowing air flowpaths leading to and in fluid communication with the radially inner and outer annular blowing slots, respectively, bleed holes in the annular inner and outer walls, the bleed holes located downstream of the blowing slots, and the bleed holes being in fluid communication with the radially inner and outer annular blowing air flowpaths.

19. An assembly as claimed in claim 18 further comprising: at least one radially inner annular row and at least one radially outer annular row of blowing air compressor blades disposed radially across the radially inner and outer annular blowing air flowpaths, respectively, and the inner and outer annular rows of blowing air compressor blades being located upstream of the radially inner and outer annular blowing slots, respectively.

20. A gas turbine engine combustor inlet diffuser assembly comprising:

a diffuser having radially spaced apart diverging annular inner and outer walls, each of the inner and outer walls having a flowpath surface bounding a diffuser flowpath extending between the inner and outer walls, radially inner and outer annular blowing slots axially located along the inner and outer walls, respectively, radially inner and outer annular blowing air flowpaths leading to and in fluid communication with the radially inner and outer annular blowing slots, respectively, and a source of blowing air for and in fluid communication with the radially inner and outer annular blowing air flowpaths, the source of blowing air being located downstream of the blowing slots and in fluid communication with the blowing air flowpath.

21. An assembly as claimed in claim 20 further comprising: at least one radially inner annular row and at least one radially outer annular row of blowing air compressor blades disposed radially across the radially inner and outer annular blowing air flowpaths, respectively, and the inner an outer annular rows of blowing air compressor blades being located upstream of the radially inner and outer annular blowing slots, respectively.

* * * * *

UNITED STATES PATENT AND TRADEMARK OFFICE
CERTIFICATE OF CORRECTION

PATENT NO. : 6,843,059 B2
DATED : January 18, 2005
INVENTOR(S) : David Louis Burrus et al.

It is certified that error appears in the above-identified patent and that said Letters Patent is hereby corrected as shown below:

Column 9,
Line 27, "flowing" should read -- blowing --

Signed and Sealed this

Nineteenth Day of April, 2005

JON W. DUDAS
*Director of the United States Patent and Trademark Office*